(12) United States Patent
Li et al.

(10) Patent No.: US 11,308,637 B2
(45) Date of Patent: Apr. 19, 2022

(54) DISTANCE DETECTION METHOD, DISTANCE DETECTION SYSTEM AND COMPUTER PROGRAM PRODUCT

(71) Applicant: Wistron Corporation, New Taipei (TW)

(72) Inventors: Chong-Wei Li, New Taipei (TW); Chih-Pin Liao, New Taipei (TW)

(73) Assignee: Wistron Corporation, New Taipei (TW)

( * ) Notice: Subject to any disclaimer, the term of this patent is extended or adjusted under 35 U.S.C. 154(b) by 71 days.

(21) Appl. No.: 16/372,432

(22) Filed: Apr. 2, 2019

(65) Prior Publication Data

US 2020/0193625 A1    Jun. 18, 2020

(30) Foreign Application Priority Data

Dec. 12, 2018 (TW) .................................. 107144888

(51) Int. Cl.
| | |
|---|---|
| *G06T 7/55* | (2017.01) |
| *G01C 21/20* | (2006.01) |
| *G01C 21/36* | (2006.01) |
| *G06V 10/44* | (2022.01) |
| *G06V 10/75* | (2022.01) |
| *G06V 20/56* | (2022.01) |

(52) U.S. Cl.
CPC .............. *G06T 7/55* (2017.01); *G01C 21/20* (2013.01); *G01C 21/3623* (2013.01); *G06V 10/44* (2022.01); *G06V 10/751* (2022.01); *G06V 20/56* (2022.01); *G06T 2207/10028* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,180,563 B2 | 5/2012 | Chang et al. | |
| 2009/0228204 A1* | 9/2009 | Zavoli | G01S 19/49 701/532 |
| 2010/0104199 A1* | 4/2010 | Zhang | G08G 1/165 382/199 |
| 2013/0197795 A1* | 8/2013 | Basnayake | G01C 21/30 701/412 |
| 2013/0257649 A1 | 10/2013 | Chang | |

(Continued)

FOREIGN PATENT DOCUMENTS

| | | |
|---|---|---|
| CN | 104729485 | 11/2016 |
| CN | 108413973 | 8/2018 |

(Continued)

OTHER PUBLICATIONS

"Office Action of Taiwan Counterpart Application," dated Jun. 13, 2019, p. 1-p. 9.

*Primary Examiner* — Jiangeng Sun
(74) *Attorney, Agent, or Firm* — JCIPRNET

(57) ABSTRACT

A distance detection method, a distance detection system and a computer program product are provided. The method includes: comparing a street view image with a real-time image according to a first distance; determining a distance between a vehicle and a target position in response to the comparison result of the street view image and the real-time image; and outputting the distance between the vehicle and the target position to prompt a user of the vehicle.

18 Claims, 8 Drawing Sheets

(56) References Cited

U.S. PATENT DOCUMENTS

| | | | | |
|---|---|---|---|---|
| 2014/0240311 | A1* | 8/2014 | Xu | G06T 13/80 |
| | | | | 345/419 |
| 2015/0023602 | A1* | 1/2015 | Wnuk | G06K 9/6202 |
| | | | | 382/190 |
| 2015/0116353 | A1* | 4/2015 | Miura | G02B 27/0075 |
| | | | | 345/632 |
| 2016/0146616 | A1* | 5/2016 | Ren | G01C 21/165 |
| | | | | 701/409 |
| 2018/0144458 | A1* | 5/2018 | Xu | G06T 7/70 |
| 2018/0364731 | A1* | 12/2018 | Liu | G06T 7/74 |
| 2019/0220676 | A1* | 7/2019 | Miyatani | G05D 1/0251 |

FOREIGN PATENT DOCUMENTS

| | | | | |
|---|---|---|---|---|
| TW | 201341758 | | 10/2013 | |
| WO | WO-2018175441 A1 * | | 9/2018 | G05D 1/0221 |

* cited by examiner

DISTANCE DETECTION METHOD, DISTANCE DETECTION SYSTEM AND COMPUTER PROGRAM PRODUCT

CROSS-REFERENCE TO RELATED APPLICATION

This application claims the priority benefit of Taiwan application serial no. 107144888, filed on Dec. 12, 2018. The entirety of the above-mentioned patent application is hereby incorporated by reference herein and made a part of this specification.

BACKGROUND OF THE DISCLOSURE

1. Field of the Disclosure

The present disclosure relates to a distance detection method, a distance detection system and a computer program product, and particularly relates to a distance detection method, a distance detection system and a computer program product combining comparison of feature points and depth information.

2. Description of Related Art

In a current navigation system, the navigation system generally informs the user about the distance between the vehicle driven by the user and the destination or the distance between the vehicle driven by the user and the intersection to be turned. For example, the navigation system outputs a voice to inform the user that the vehicle is still 100 meters away from the destination, or turn left at the intersection 100 meters ahead. In general, the aforementioned distance is usually calculated through the coordinates obtained by the global positioning system (GPS) of the vehicle and the coordinates of the destination (or intersection). It should be noted that the GPS has the problem of low positioning accuracy, so that the aforementioned distance returned to the user is usually inaccurate. Particularly, in urban areas with many intersections, a few meters apart may be different intersections and are more likely to cause navigation errors.

SUMMARY OF THE DISCLOSURE

The present disclosure is directed to a distance detection method, a distance detection system and a computer program product which are capable of improving the accuracy of the distance returned to a user by a navigation system.

The present disclosure is directed to a distance detection method for navigating a vehicle. The method includes: comparing a street view image with a real-time image according to a first distance; determining a distance between the vehicle and a target position in response to the comparison result of the street view image and the real-time image; and outputting the distance between the vehicle and the target position to prompt a user of the vehicle.

The present disclosure is directed to a distance detection system for navigating a vehicle, and the distance detection system includes a system for vehicles. The system for vehicles includes a processor. The processor compares a street view image with a real-time image according to a first distance. The processor determines a distance between the vehicle and a target position in response to the comparison result of the street view image and the real-time image. The processor outputs the distance between the vehicle and the target position to prompt a user of the vehicle.

The present disclosure is directed to a computer program product, including a computer readable recording medium, the computer readable recording medium records at least one program instruction, and the program instruction is loaded into an electronic device to execute the following steps: comparing a street view image with a real-time image according to a first distance; determining a distance between a vehicle and a target position in response to the comparison result of the street view image and the real-time image; and outputting the distance between the vehicle and the target position to prompt a user of the vehicle.

Based on the above, the distance detection method, the distance detection system and the computer program product of the present disclosure combine comparison of feature points and depth information to improve the accuracy of the distance returned to the user by the navigation system.

In order to make the aforementioned and other objectives and advantages of the present disclosure comprehensible, embodiments accompanied with figures are described in detail below.

DESCRIPTION OF THE EMBODIMENTS

Figure 1:
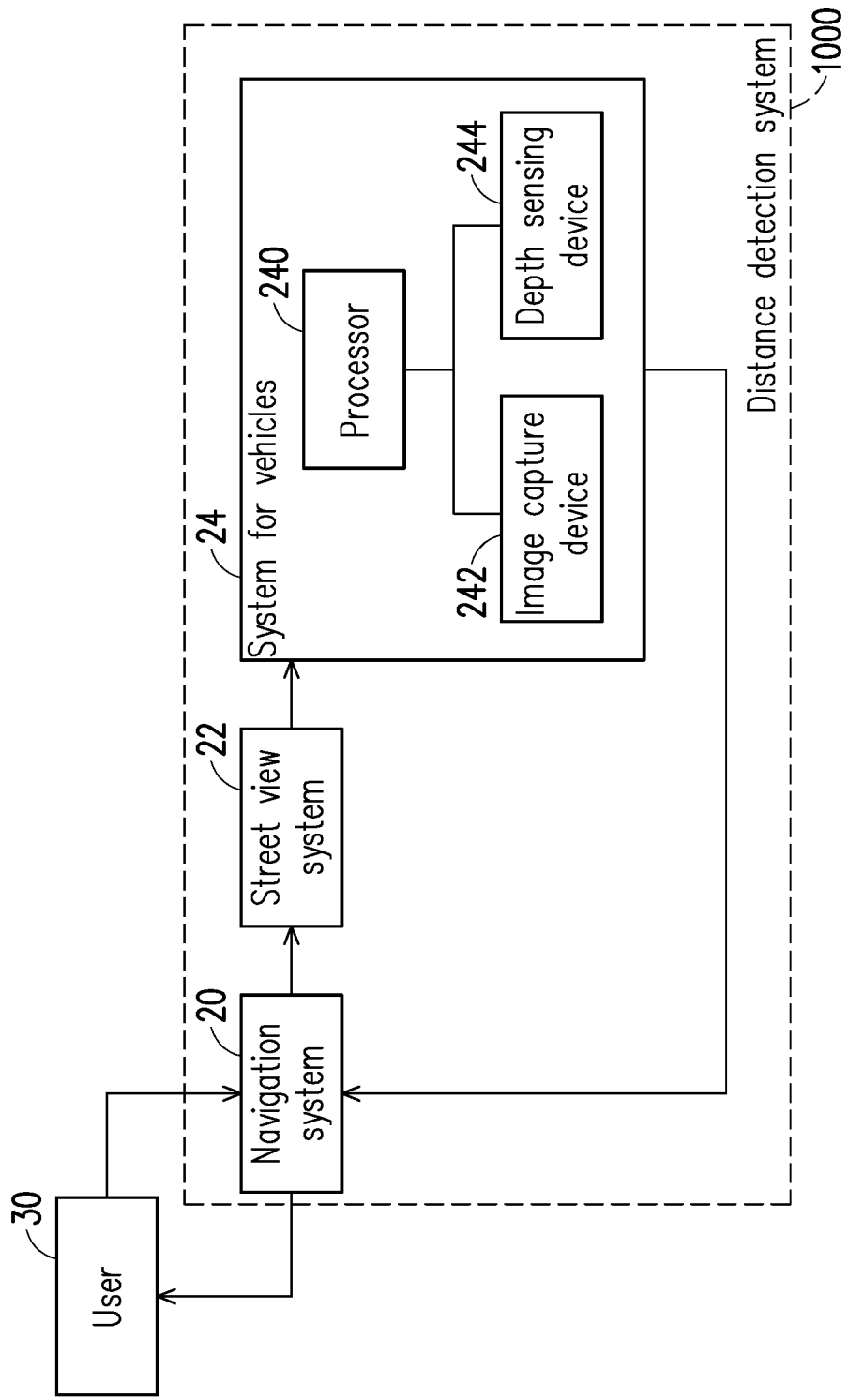
FIG. 1 is a schematic diagram of a distance detection system according to an embodiment of the present disclosure.

The examples of the exemplary embodiments are described in the drawings with reference to the exemplary embodiments of the present disclosure. In addition, wherever possible, elements or components using the same numbers in the drawings and embodiments refer to the same or similar parts.

FIG. 1 is a schematic diagram of a distance detection system according to an embodiment of the present disclosure.

Referring to FIG. 1, the distance detection system 1000 includes a navigation system 20, a street view system 22 and a system 24 for vehicles. The navigation system 20, the street view system 22 and the system 24 for vehicles can be electrically connected to each other in a wired or wireless mode. For example, the distance detection system 1000 is configured in a vehicle.

The navigation system 20 can plan a navigation path according to the current position of the vehicle and the destination position and provide related navigation information to a user 30 so as to guide the user 30 to drive the vehicle to the destination position. The navigation system 20 can be a function of navigation in the Google map or other navigation systems and is not limited herein.

The street view system 22 can obtain at least one street view image of the position of a coordinate according to the coordinate. The street view system 22 can be the Google map or other street view systems and is not limited herein.

The system 24 for vehicles includes a processor 240, an image capture device 242, a depth sensing device 244 and a storage device (not shown), where the image capture device 242, the depth sensing device 244 and the storage device are coupled to the processor 240. It should be noted that in the present embodiment, the depth sensing device 244 and the image capture device 242 are configured on a vehicle.

The processor 240 can be a central processing unit (CPU), other programmable microprocessors for general purposes or special purposes, a digital signal processor (DSP), a programmable controller, an application specific integrated circuit (ASIC), or an assembly of other similar elements or the above elements.

The image capture device 242 is used for capturing one or more images. For example, the image capture device 242 can be equipped with a pick-up lens of a charge coupled device (CCD), a complementary metal-oxide semiconductor (CMOS) element or other kinds of photosensitive elements.

The depth sensing device 244 can be image capture device which is the same as the image capture device 242, and can be used for capturing an image and enabling the processor 240 to generate a depth map according to the image captured by the depth sensing device 244 and the image captured by the image capture device 242 so as to judge the depth of an object in the image shot by the image capture device 242 (or the image shot by the depth sensing device 244). Alternatively, the depth sensing device 244 can also be a depth sensor for transmitting infrared rays and receiving reflection of the infrared rays to obtain the depth. Alternatively, the depth sensing device 244 can also be other kinds of sensors capable of obtaining depth information and is not limited herein.

The aforementioned storage device can be any type of fixed or movable random access memory (RAM), read-only memory (ROM) or flash memory or an assembly of similar elements or the above elements. In the exemplary embodiment, a plurality of program code segments is stored in the storage device, and after the program code segments are installed, the processor 240 executes the program code segments. For an example, the storage device includes a plurality of modules, and each operation of the distance detection method of the present disclosure is respectively executed by the modules, where each module is composed of one or more program code segments. However, the present disclosure is not limited herein, and each operation of the distance detection system 1000 can also be implemented in a mode of using other hardware forms. In the exemplary embodiment, the navigation system 20 and the street view system 22 are also stored in the aforementioned storage device in a mode of program code segments. After the program code segments are installed, the processor 240 executes the functions of the navigation system 20 and the street view system 22.

In the embodiment, the system 24 for vehicles is also equipped with a position sensor (not shown). The position sensor can be coupled to the processor 240. The position sensor can be instruments such as a global positioning system (GPS) capable of obtaining coordinates of the vehicle equipped with the distance detection system 1000. In addition, the navigation system 20 and the street view system 22 can also obtain the coordinates of the vehicle equipped with the distance detection system 1000 respectively from the position sensor.

Figure 2:
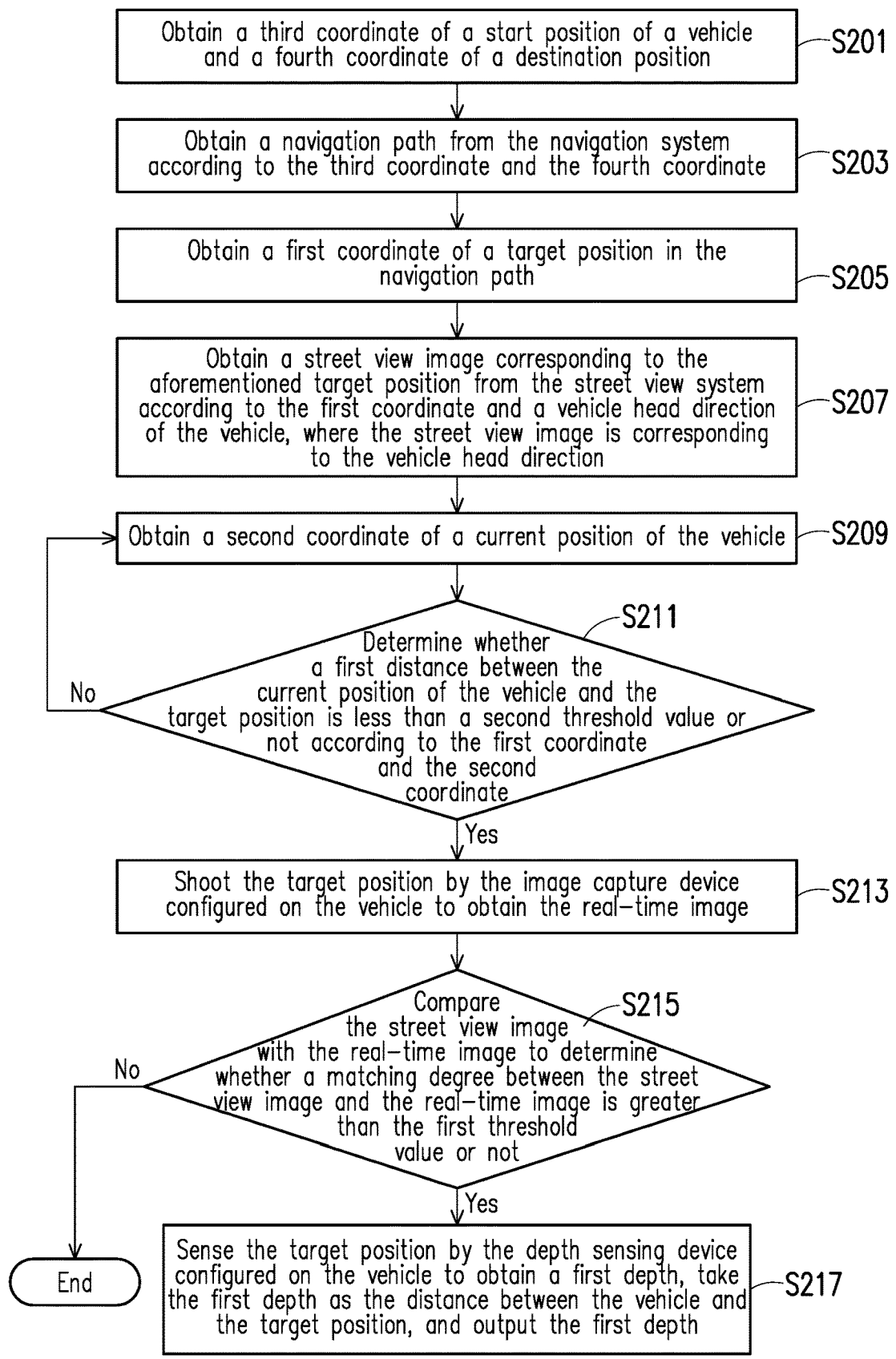
FIG. 2 is a flow diagram of a distance detection method according to an embodiment of the present disclosure.

FIG. 2 is a flow diagram of a distance detection method according to an embodiment of the present disclosure.

Simultaneously referring to FIG. 1 and FIG. 2, firstly, the user 30 can, for example, input the destination position expected to arrive into the navigation system 20. The navigation system 20, for example, takes the current position of the vehicle driven by the user 30 as a start position, and obtains the coordinate (also known as third coordinate) of the start position by the position sensor in the system 24 for vehicles. In addition, the navigation system 20 can also obtain the coordinate (also known as fourth coordinate) of the destination position (S201).

Subsequently, the navigation system 20 plans a navigation path according to the third coordinate and the fourth coordinate so as to be supplied for the processor 240 (S203). The processor 240 can obtain the coordinate (also known as first coordinate) of at least one target position in the navigation path by the navigation system 20 (S205).

Figure 3:
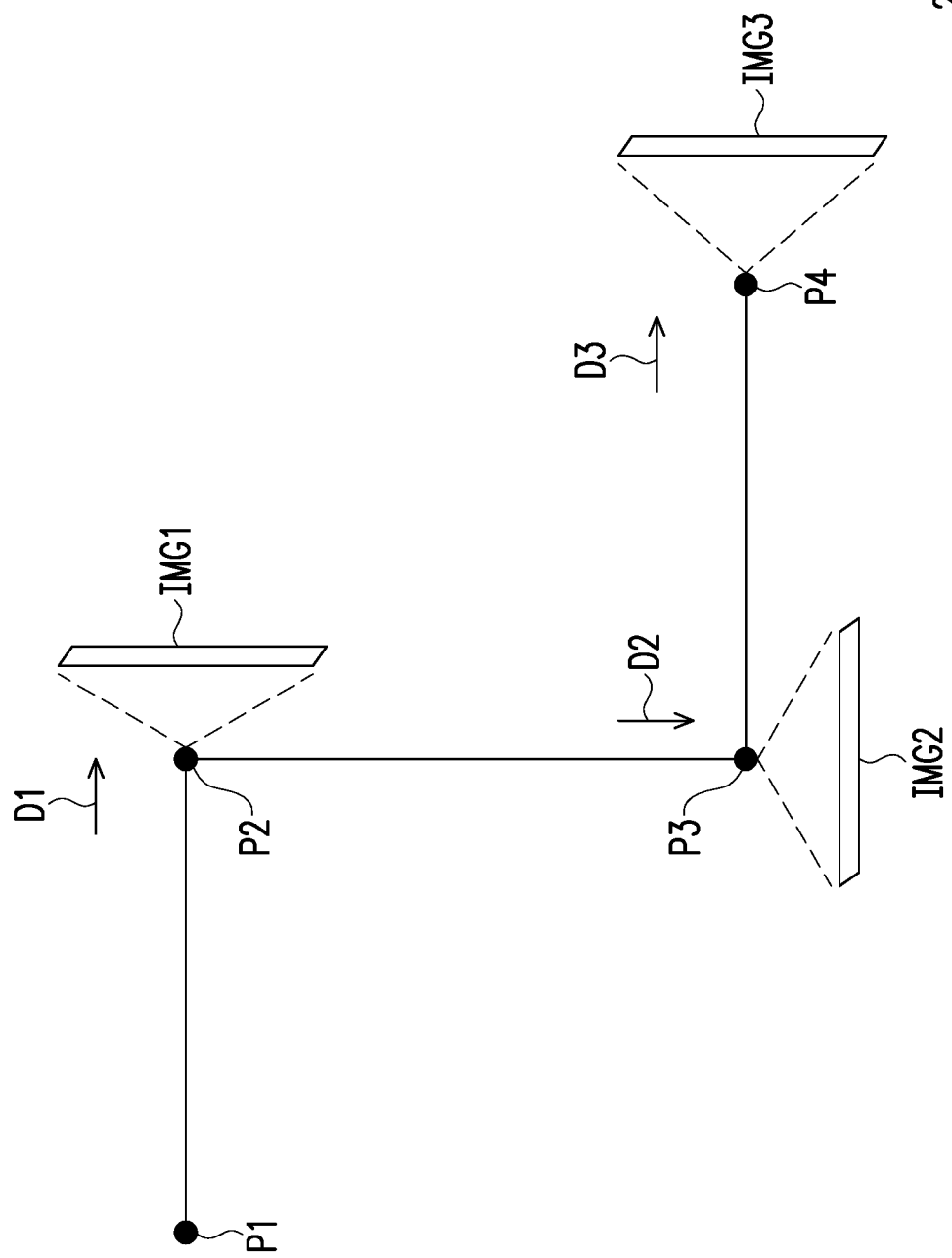
FIG. 3 is a schematic diagram of a target position in a navigation path according to an embodiment of the present disclosure.

For example, FIG. 3 is a schematic diagram of a target position in a navigation path according to an embodiment of the present disclosure.

Referring to FIG. 3, the navigation system 20 can plan and obtain a navigation path 2000 according to the coordinate P1 of the start position (namely the aforementioned third coordinate) and the coordinate P4 of the destination position (namely the aforementioned fourth coordinate). The navigation system 20 can obtain the coordinates of at least one target position in the navigation path 2000. It should be noted that the "target position" can be an intersection that needs to be turned and/or a destination position in the navigation path. The coordinates P2 and P3 of the intersection and the coordinate P4 of the destination position are the aforementioned "coordinates of the target position" (namely the first coordinates).

Referring to FIG. 1 and FIG. 2 again, after the navigation system 20 obtains the first coordinates, the processor 240 obtains the street view image corresponding to the aforementioned target position from the street view system 22 according to the first coordinates and the vehicle head direction of the vehicle driven by the user 30, where the street view image is corresponding to the vehicle head direction (S207).

More specifically, referring to FIG. 3 again, after the navigation system 20 obtains the coordinates P2, P3 and P4 of three target positions, the processor 240 obtains the street view image IMG1 facing the vehicle head direction D1 on the coordinate P2, the street view image IMG2 facing the vehicle head direction D2 on the coordinate P3 and the street view image IMG3 facing the vehicle head direction D3 on the coordinate P4 from the street view system 22 according to the three coordinates P2, P3 and P4 and the three vehicle head directions D1, D2 and D3 when the vehicle runs forward in the navigation path.

Referring to FIG. 1 and FIG. 2 again, after execution of obtaining the street view image corresponding to the target position, the processor 240 obtains the coordinate (also known as second coordinate) of a current position of the vehicle driven by the user 30 through the position sensor (S209). In other words, in step S209, the user 30 can drive the vehicle according to the aforementioned navigation path 2000. In the running process of the vehicle, the processor 240 obtains the coordinate of the current position of the vehicle through the position sensor.

Then, the processor 240 determines whether the distance (also known as the first distance) between the current position of the vehicle driven by the user 30 and one of the target positions is less than a threshold value (also known as a second threshold value) according to the aforementioned first coordinate and the aforementioned second coordinates (S211). When the distance between the current position of the vehicle driven by the user 30 and one of the target positions is not less than the second threshold value, step S209 is executed again. However, when the distance between the current position of the vehicle driven by the user 30 and one of the target positions is less than the second threshold value, the processor 240 shoots the currently approaching target position by the image capture device 242 configured on the vehicle driven by the user 30 to obtain a real-time image (S213).

Referring to FIG. 3 again, by taking the vehicle driven by the user 30 close to the target position corresponding to the coordinate P2 as an example, when the processor 240 determines that the distance between the current position of the vehicle driven by the user 30 and the target position corresponding to the coordinate P2 is less than the second threshold value (such as 800 meters) according to the coordinate P2 (namely the aforementioned first coordinate) and the coordinate (namely the aforementioned second coordinate) of the current position of the vehicle, the processor 240 shoots the currently approaching target position corresponding to the coordinate P2 towards the vehicle head direction D1 to obtain a real-time image by the image capture device 242 configured on the vehicle driven by the user 30. It is assumed that in this case, simultaneously referring to FIG. 1, FIG. 2 and FIG. 3, after step S213 is executed, the processor 240 compares the street view image IMG1 with the aforementioned real-time image to judge whether the matching degree between the street view image IMG1 and the real-time image is greater than a threshold value (also known as the first threshold value) or not (S215).

Figure 4:
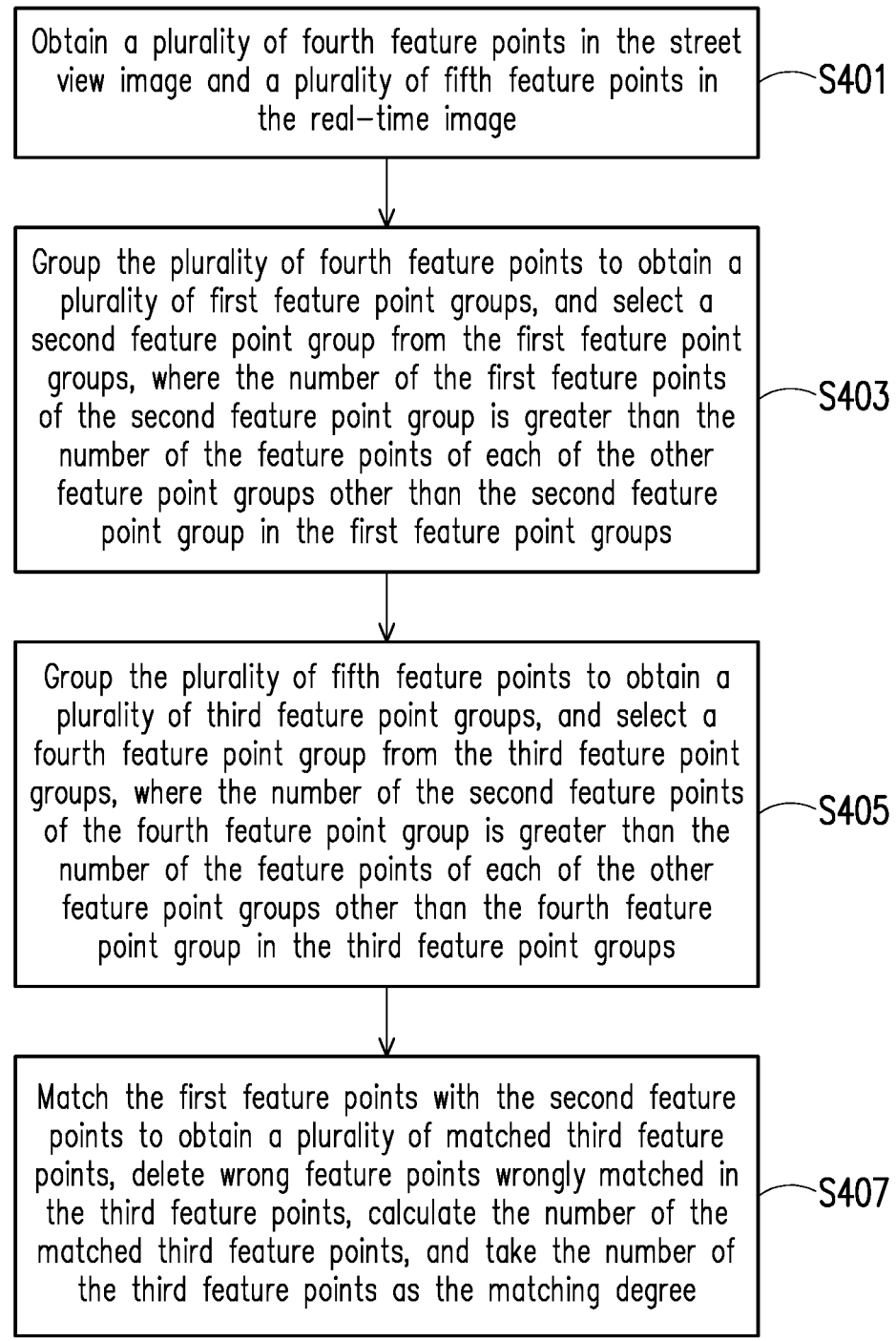
FIG. 4 is a flow diagram of a method for determining whether a matching degree between a street view image and a real-time image is greater than a first threshold value or not according to an embodiment of the present disclosure.

FIG. 4 is a flow diagram of a method for determining whether a matching degree between a street view image and a real-time image is greater than a first threshold value or not according to an embodiment of the present disclosure.

Referring to FIG. 4, the detailed flows of step S215 in FIG. 2 can be as shown in FIG. 4. Simultaneously referring to FIG. 3 and FIG. 4, by taking the vehicle driven by the user 30 close to the target position corresponding to the coordinate P2 as an example, firstly, the processor 240 may obtain a plurality of feature points (also known as fourth feature points) in the street view image IMG1 and a plurality of feature points (also known as fifth feature points) in the aforementioned real-time image (S401). For example, a speeded up robust feature (SURF) algorithm or a scale-invariant feature transform (SIFT) algorithm can be used for obtaining the fourth feature points in the aforementioned street view image IMG1 and the fifth feature points in the real-time image.

Then, the processor 240 groups the fourth feature points in the street view image IMG1 by using a K-mean algorithm to obtain a plurality of feature point groups (also known as first feature point groups), and selects a feature point group (also known as a second feature point group) from the first feature point groups, where the number of the feature points (also known as first feature points) of the second feature point group is greater than the number of the feature points of each of the other feature point groups other than the second feature point group in the first feature point groups (S403). In other words, the number of the feature points of the second feature point group is maximum in the aforementioned first feature point groups.

In addition, the processor 240, for example, groups the fifth feature points in the real-time image by using the K-mean algorithm to obtain a plurality of feature point groups (also known as third feature point groups), and selects a feature point group (also known as a fourth feature point group) from the third feature point groups, where the number of the feature points (also known as second feature points) of the fourth feature point group is greater than the number of the feature points of each of the other feature point groups other than the fourth feature point group in the third feature point groups (S405). In other words, the number of the feature points of the fourth feature point group is maximum in the aforementioned third feature point groups.

After obtaining the aforementioned first feature points and second feature points, the processor 240 matches the first feature points with the second feature points so as to obtain a plurality of feature points (also known as third feature points) matched in the second feature points of the real-time image. In other words, the third feature points respectively have corresponding feature points in the first feature points in the street view image IMG1. In addition, the processor 240 can also, for example, execute a random sample consensus (RANSAC) algorithm to delete wrong feature points wrongly matched in the third feature points, then calculates the number of the matched third feature points, and takes the number of the third feature points as a matching degree (S407).

Referring to FIG. 1, FIG. 2 and FIG. 3 again, by taking the vehicle driven by the user 30 close to the target position corresponding to the coordinates P2 as an example, in the operation of executing step S215, when the matching degree between the street view image IMG2 and the real-time image is greater than the first threshold value, the system 24 for vehicles may execute step S217; and when the matching degree between the street view image and the real-time image is not greater than the first threshold value, the flows of FIG. 2 are ended. In detail, when the number of the third feature points accounts for greater than 80% of the number of the second feature points, the processor 240 determines that the aforementioned matching degree is greater than the first threshold value (namely 80%); when the number of the third feature points accounts for not greater than 80% of the number of the second feature points, the processor 240 determines that the aforementioned matching degree is not greater than the first threshold value; and when the matching degree is greater than the first threshold value, the processor 240 senses the target position corresponding to the coordinates P2 by the depth sensing device 244 so as to obtain a depth (also known as a first depth), takes the first depth as the distance between the vehicle and the target position corresponding to the coordinates P2 and outputs the first depth to the navigation system 20, and the navigation system 20 outputs the first depth to the user 30 to prompt the user 30 (S217).

In more detail, FIG. 5A-5D are schematic diagrams for obtaining the first depth according to an embodiment of the present disclosure.

Figure 5A:
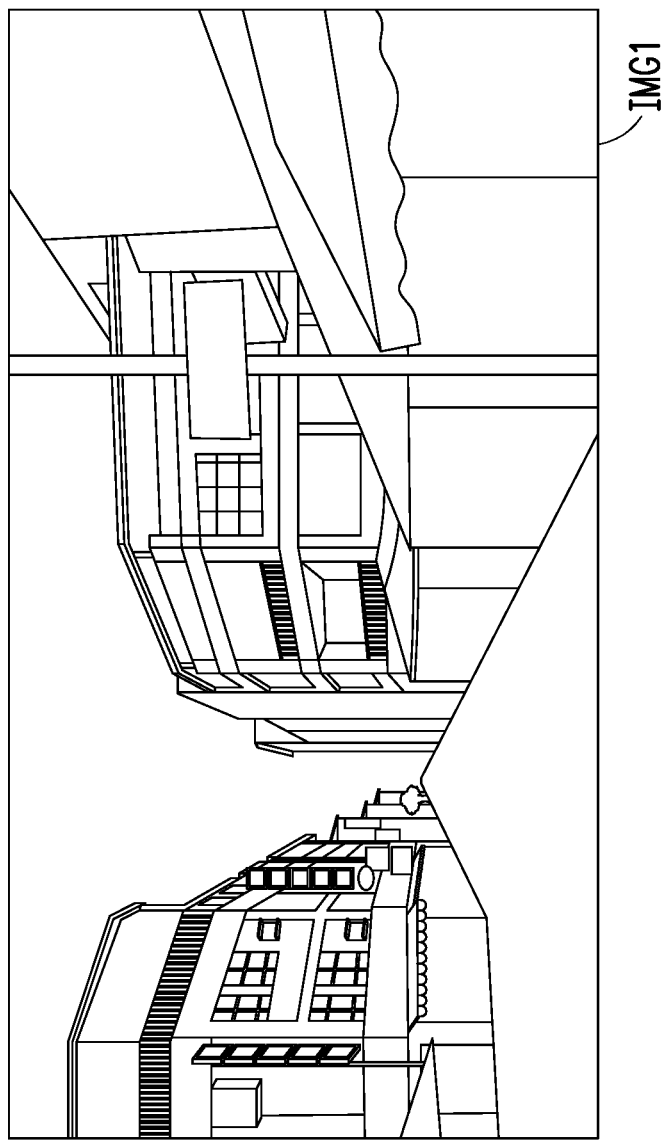
FIG. 5A-5D are schematic diagrams for obtaining a first depth according to an embodiment of the present disclosure.
Figure 5B:
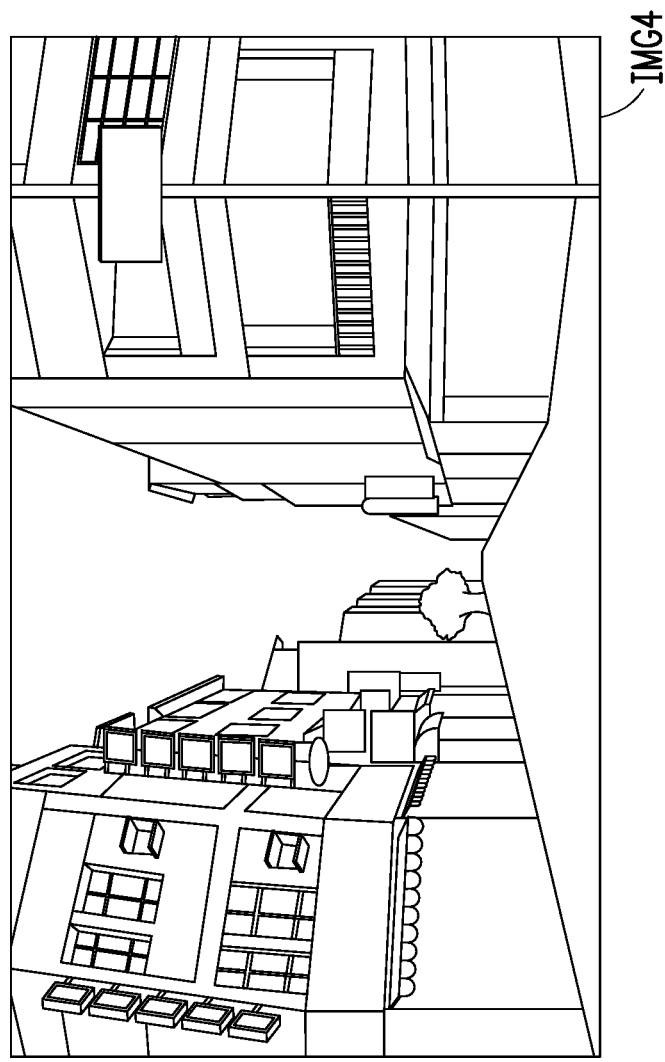
Figure 5C:
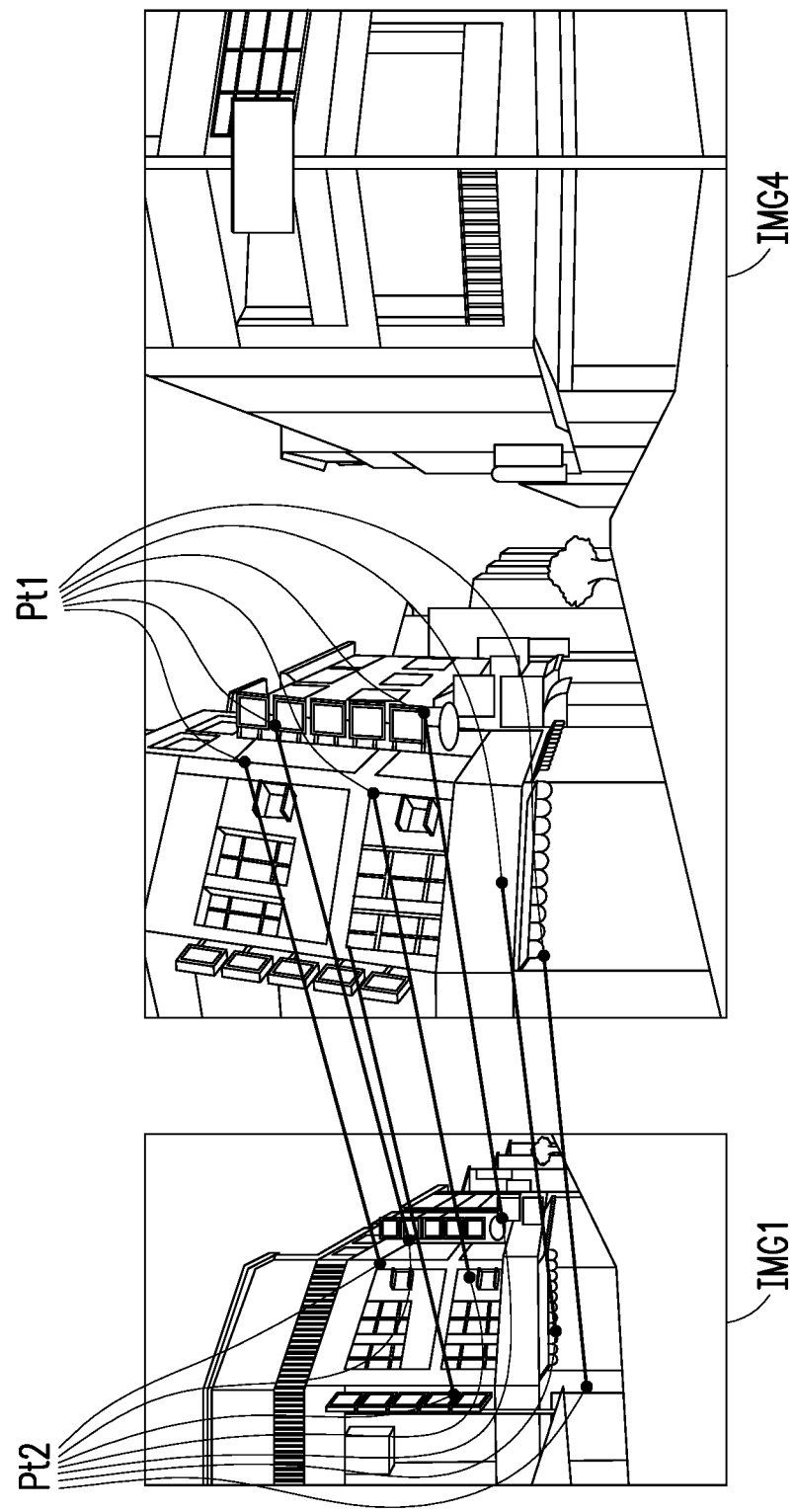
Figure 5D:
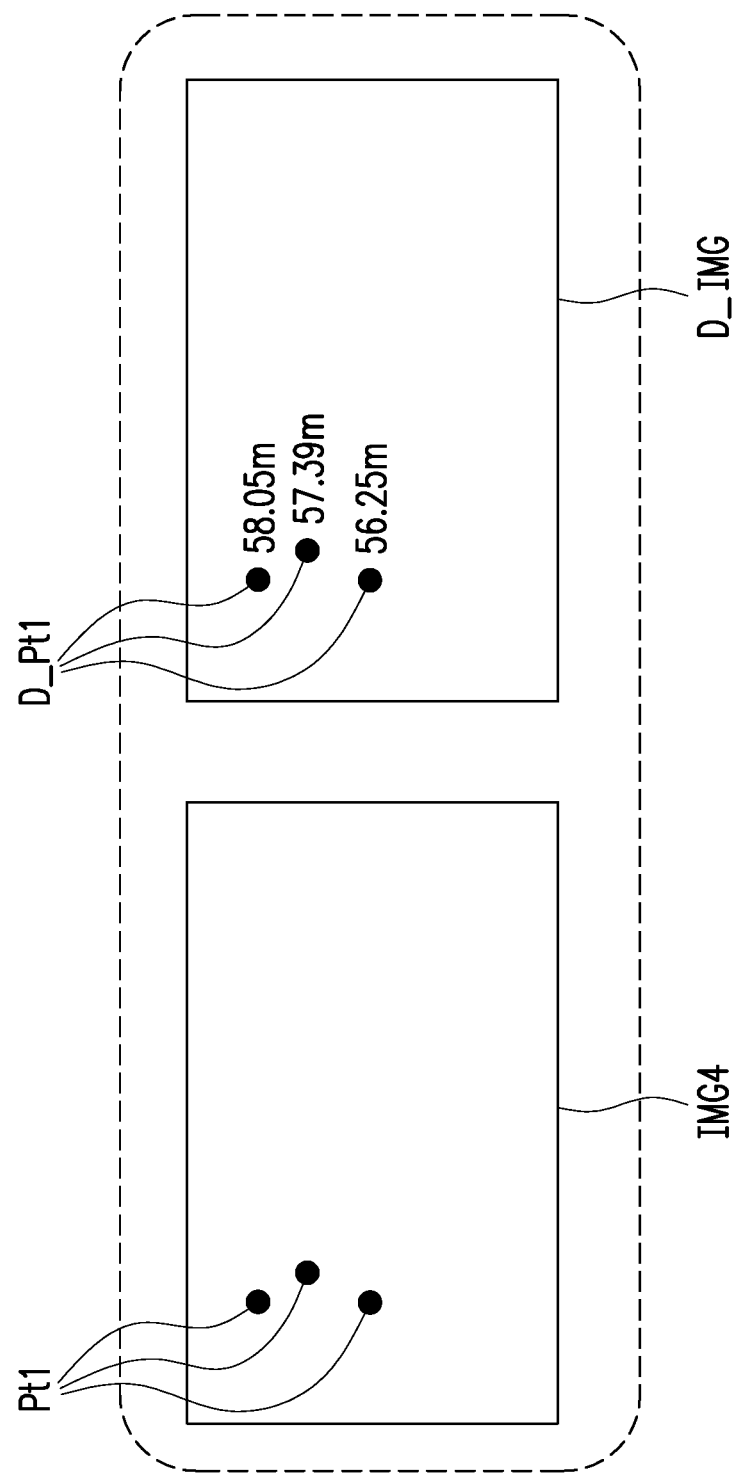

Referring to FIG. 5A to 5D, by taking the aforementioned vehicle driven by the user 30 close to the target position corresponding to the coordinates P2 as an example, FIG. 5A shows the aforementioned street view image IMG1; FIG. 5B shows the real-time image IMG4 of the currently approaching target position corresponding to the coordinate P2 towards the vehicle head direction D1 in FIG. 3, shot by the image capture device 242; and FIG. 5C shows the corresponding relationship between a plurality of third feature points Pt1 in the real-time image IMG4 and a plurality of feature points Pt2 corresponding to the third feature points Pt1 respectively in the street view image IMG1, obtained by executing the flows of FIG. 4. In step S217, the processor 240 obtains an image (also known as a first image) of the target position corresponding to the coordinate P2, shot by the depth sensing device 244; and the processor 240 can obtain a depth map D_IMG as shown in FIG. 5D according to the first image and the real-time image IMG4. In more detail, the image capture device 242 and the depth sensing device 244 are horizontally configured at an interval. When the image capture device 242 and the depth sensing device 244 simultaneously capture images of a scene, the images captured by the image capture device 242 and the depth sensing device 244 can be used for obtaining a depth map for showing the depth of each object in the scene. Therefore, as shown in FIG. 5D, after obtaining the depth map D_IMG according to the first image and the real-time image IMG4, the processor 240 obtains a plurality of depths D_Pt1 (also known as second depths) of the third feature points Pt1 in the depth map D_IMG according to the positions of the third feature points Pt1 in the real-time image IMG4; and the processor 240 averages the second depths so as to obtain the aforementioned first depth. For example, the aforementioned second depths are 58.05 meters, 57.39 meters and 56.25 meters respectively, so that the first depth can be 57.23 meters. However, it should be noted that the present disclosure is not limited herein, and the aforementioned first depth can also be obtained in other modes in other embodiments. For example, the depth sensing device 244 can transmit infrared rays and receive reflection of the infrared rays to obtain the aforementioned first depth.

In conclusion, the distance detection method, the distance detection system and the computer program product provided by the present disclosure combine comparison of the feature points and depth information to improve the accuracy of the distance returned to the user by the navigation system.

Although the present disclosure has been disclosed with the above embodiments, it is not intended to limit the present disclosure. Any person of ordinary skill in the art can make some changes and modifications without departing from the spirit and scope of the present disclosure. Therefore, the protection scope of the present disclosure shall be defined by the appended claims.

What is claimed is:

1. A distance detection method for navigating a vehicle, comprising:
    comparing a street view image with a real-time image according to a first distance;
    determining a depth distance between the vehicle and a target position from an average value of a depth map associated with the real-time image based on a comparison result of the street view image and the real-time image, wherein the target position comprises at least one coordinate; and
    outputting the depth distance between the vehicle and the target position based on the depth map to prompt a user of the vehicle,
    wherein the step of comparing the street view image with the real-time image comprises:
    obtaining a plurality of first feature points and a plurality of second feature points, wherein the plurality of first feature points are selected from the street view image corresponding to a first geographic position, and the plurality of second feature points are selected from the real-time image corresponding to the same first geographic position,
    wherein the step of obtaining the plurality of first feature points and the plurality of second feature points comprises:
    obtaining a plurality of fourth feature points in the street view image and a plurality of fifth feature points in the real-time image;
    grouping the plurality of fourth feature points to obtain a plurality of first feature point groups, and selecting a second feature point group with the plurality of first feature points from the plurality of first feature point groups, wherein the number of the plurality of first feature points is greater than the number of the feature points of each of the other feature point groups other than the second feature point group in the plurality of first feature point groups; and
    grouping the plurality of fifth feature points to obtain a plurality of third feature point groups, and selecting a fourth feature point group with the plurality of second feature points from the plurality of third feature point groups, wherein the number of the plurality of second feature points is greater than the number of the feature points of each of the other feature point groups other than the fourth feature point group in the plurality of third feature point groups.

2. The distance detection method according to claim 1, wherein before the step of comparing the street view image with the real-time image, the method further comprises:
    obtaining a navigation path of the vehicle;
    obtaining a first coordinate of the target position in the navigation path;
    obtaining a second coordinate of a current position of the vehicle; and
    determining the first distance between the current position of the vehicle and the target position according to the first coordinate and the second coordinate.

3. The distance detection method according to claim 2, wherein the step of comparing the street view image with the real-time image comprises:
    obtaining the street view image corresponding to the target position from a street view system; and
    obtaining the real-time image of the target position, wherein the real-time image is shot by an image capture device configured on the vehicle,
    wherein before the step of obtaining the real-time image of the target position, the method further comprises:
    determining whether the first distance is less than a second threshold value or not; and
    only when the first distance is less than the second threshold value, executing the step of obtaining the real-time image of the target position.

4. The distance detection method according to claim 3, wherein the step of obtaining the street view image corresponding to the target position from the street view system comprises:
    obtaining the street view image corresponding to a vehicle head direction from the street view system according to the first coordinate and the vehicle head direction of the vehicle.

5. The distance detection method according to claim 1, wherein the step of comparing the street view image with the real-time image further comprises:
    matching the plurality of first feature points with the plurality of second feature points to calculate the number of a plurality of third feature points, and taking the number of the plurality of third feature points as a matching degree,
    wherein the step of matching the first feature points with the second feature points comprises:
    deleting at least one wrong feature point incorrectly matched in the plurality of third feature points.

6. The distance detection method according to claim 5, further comprising:
    obtaining a first image shot by a depth sensing device;

obtaining the depth map according to the first image and the real-time image;

obtaining a plurality of second depths of the plurality of third feature points in the depth map; and averaging the plurality of second depths to obtain a first depth, and taking the first depth as the depth distance between the vehicle and the target position.

7. The distance detection method according to claim 1, wherein the step of comparing the street view image with the real-time image comprises:

comparing the street view image with the real-time image to judge whether a matching degree between the street view image and the real-time image is greater than a first threshold value or not; and when the matching degree is greater than the first threshold value, the step of outputting the depth distance between the vehicle and the target position to prompt the user of the vehicle comprises:

obtaining a first depth as the depth distance between the vehicle and the target position, and outputting the first depth, wherein the first depth is obtained by sensing the target position by a depth sensing device configured on the vehicle.

8. The distance detection method according to claim 2, wherein the step of obtaining the navigation path of the vehicle comprises:

obtaining a third coordinate of a start position of the vehicle and a fourth coordinate of a destination position; and obtaining the navigation path from a navigation system according to the third coordinate and the fourth coordinate.

9. A distance detection system for navigating a vehicle, comprising:

a system for vehicles, comprising a processor, wherein the processor compares a street view image with a real-time image according to a first distance, the processor determines a depth distance between the vehicle and a target position from an average value of a depth map associated with the real-time image based on a comparison result of the street view image and the real-time image, wherein the target position comprises at least one coordinate, and the processor outputs the depth distance between the vehicle and the target position based on the depth map to prompt a user of the vehicle, wherein in the operation of comparing the street view image with the real-time image, the processor obtains a plurality of first feature points and a plurality of second feature points, wherein the plurality of first feature points are selected from the street view image corresponding to a first geographic position, and the plurality of second feature points are selected from the real-time image corresponding to the same first geographic position, wherein in the operation of obtaining the plurality of first feature points and the plurality of second feature points, the processor obtains a plurality of fourth feature points in the street view image and a plurality of fifth feature points in the real-time image;

the processor groups the plurality of fourth feature points to obtain a plurality of first feature point groups, and selects a second feature point group with the plurality of first feature points from the plurality of first feature point groups, wherein the number of the plurality of first feature points is greater than the number of the feature points of each of the other feature point groups other than the second feature point group in the plurality of first feature point groups; and the processor groups the plurality of fifth feature points to obtain a plurality of third feature point groups, and selects a fourth feature point group with the plurality of second feature points from the plurality of third feature point groups, wherein the number of the plurality of second feature points is greater than the number of the feature points of each of the other feature point groups other than the fourth feature point group in the plurality of third feature point groups.

10. The distance detection system according to claim 9, further comprising:

a navigation system, wherein before the operation of comparing the street view image with the real-time image, the navigation system obtains a navigation path of the vehicle, the navigation system obtains a first coordinate of the target position in the navigation path, the navigation system obtains a second coordinate of a current position of the vehicle, and the processor determines the first distance between the current position of the vehicle and the target position according to the first coordinate and the second coordinate.

11. The distance detection system according to claim 10, further comprising:

a street view system, wherein in the operation of comparing the street view image with the real-time image, the processor obtains the street view image corresponding to the target position from the street view system, and the processor obtains the real-time image of the target position, wherein the real-time image is shot by an image capture device configured on the vehicle.

12. The distance detection system according to claim 11, wherein in the operation of obtaining the street view image corresponding to the target position from the street view system, the processor obtains the street view image corresponding to a vehicle head direction from the street view system according to the first coordinate and the vehicle head direction of the vehicle.

13. The distance detection system according to claim 11, wherein before the operation of obtaining the real-time image of the target position, the processor determines whether the first distance is less than a second threshold value or not, and only when the first distance is less than the second threshold value, the processor executes the operation of obtaining the real-time image of the target position.

14. The distance detection system according to claim 9, wherein in the operation of comparing the street view image with the real-time image, the processor further matches the plurality of first feature points with the plurality of second feature points to calculate the number of a plurality of third feature points, and takes the number of the plurality of third feature points as a matching degree, wherein in the operation of matching the first feature points with the second feature points, the processor deletes at least one wrong feature point incorrectly matched in the plurality of third feature points.

15. The distance detection system according to claim 14, wherein in the operation of obtaining the first depth, the processor obtains a first image shot by a depth sensing device, the processor obtains the depth map according to the first image and the real-time image, the processor obtains a plurality of second depths of the plurality of third feature points in the depth map, and the processor averages the plurality of second depths to obtain the first depth, and takes the first depth as the depth distance between the vehicle and the target position.

16. The distance detection system according to claim 9, wherein the system for vehicles further comprises a depth sensing device, and the depth sensing device is configured on the vehicle, wherein in the operation of comparing the street view image with the real-time image, the processor compares the street view image with the real-time image to judge whether a matching degree between the street view image and the real-time image is greater than a first threshold value or not; and when the matching degree is greater than the first threshold value, in the operation of outputting the depth distance between the vehicle and the target position to prompt the user of the vehicle, the processor obtains a first depth as the depth distance between the vehicle and the target position, and outputs the first depth, wherein the first depth is obtained by sensing the target position by the depth sensing device.

17. The distance detection system according to claim 10, wherein in the operation of obtaining the navigation path of the vehicle, the processor obtains a third coordinate of a start position of the vehicle and a fourth coordinate of a destination position, and the processor obtains the navigation path from a navigation system according to the third coordinate and the fourth coordinate.

18. A computer program product, comprising a computer readable recording medium, wherein the computer readable recording medium records at least one program instruction, and the program instruction is loaded into an electronic device to execute the following steps:

comparing a street view image with a real-time image according to a first distance;

determining a depth distance between a vehicle and a target position from an average value of a depth map associated with the real-time image based on a comparison result of the street view image and the real-time image, wherein the target position comprises at least one coordinate; and outputting the depth distance between the vehicle and the target position based on the depth map to prompt a user of the vehicle, wherein the step of comparing the street view image with the real-time image comprises:

obtaining a plurality of first feature points and a plurality of second feature points, wherein the plurality of first feature points are selected from the street view image corresponding to a first geographic position, and the plurality of second feature points are selected from the real-time image corresponding to the same first geographic position, wherein the step of obtaining the plurality of first feature points and the plurality of second feature points comprises:

obtaining a plurality of fourth feature points in the street view image and a plurality of fifth feature points in the real-time image;

grouping the plurality of fourth feature points to obtain a plurality of first feature point groups, and selecting a second feature point group with the plurality of first feature points from the plurality of first feature point groups, wherein the number of the plurality of first feature points is greater than the number of the feature points of each of the other feature point groups other than the second feature point group in the plurality of first feature point groups; and grouping the plurality of fifth feature points to obtain a plurality of third feature point groups, and selecting a fourth feature point group with the plurality of second feature points from the plurality of third feature point groups, wherein the number of the plurality of second feature points is greater than the number of the feature points of each of the other feature point groups other than the fourth feature point group in the plurality of third feature point groups.

* * * * *